Aug. 18, 1970  A. T. HOKE  3,524,253
SELF-POWERED GROOMING TOOL
Filed Aug. 19, 1968
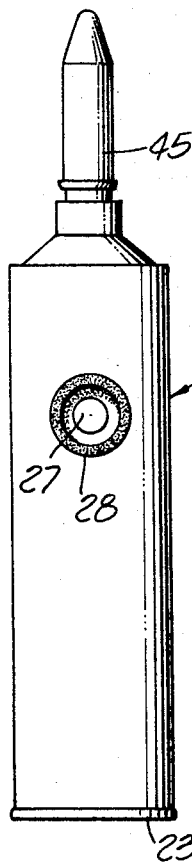
FIG. 1.
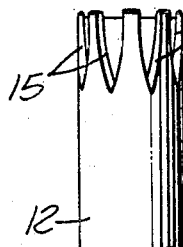
FIG. 5.
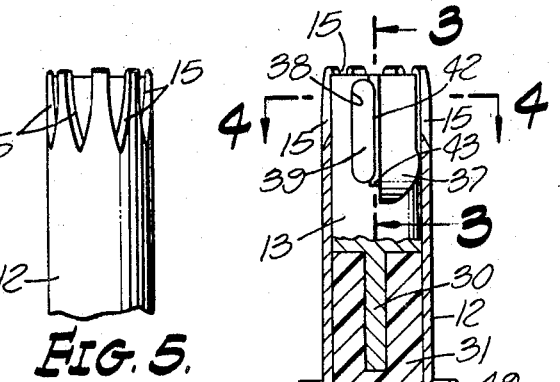
FIG. 2.
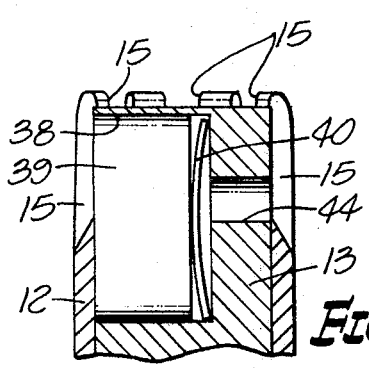
FIG. 3.
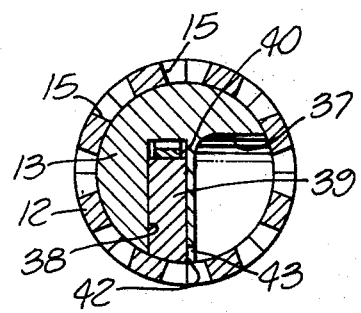
FIG. 4.
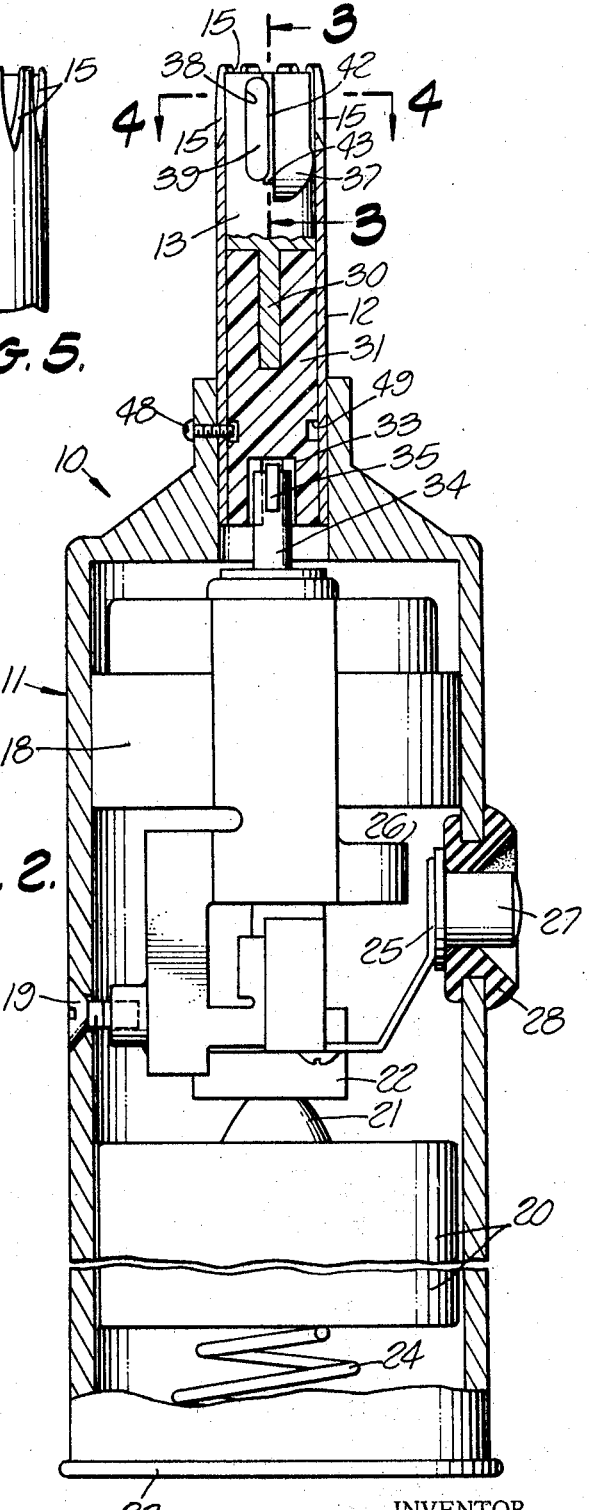
INVENTOR
ARCHIE T. HOKE
BY
ATTORNEYS

United States Patent Office 3,524,253
Patented Aug. 18, 1970

3,524,253
SELF-POWERED GROOMING TOOL
Archie T. Hoke, 1732 Coolidge St.,
Altadena, Calif. 91001
Filed Aug. 19, 1968, Ser. No. 753,551
Int. Cl. B26b 19/16
U.S. Cl. 30—29.5　　　　　　　　　　　8 Claims

ABSTRACT OF THE DISCLOSURE

A self-contained, self-powered hand-held grooming tool for clipping hair growing in the nostril and outer ear. A cylindrical comb cooperates with a rotary cutter head housed therewithin and movably supporting a cutter blade rotating past the interior surface of the comb. The cutter head is driven by a battery-powered miniature electric motor.

---

This invention relates to a power-operated trimmer and more particularly to a self-contained battery-driven grooming tool suitable for use in clipping hair within the outer ear and the nostril.

It is a primary object of the present invention to provide a new and improved inexpensive battery-driven trimmer easily grasped in the user's hand and deftly manipulated while trimming hair growth occurring in the nostril and the outer ear.

Another object of the invention is the provision of a greatly simplified positive-action, non-clogging self-contained tool for clipping very fine hair growth without risk of injury.

Another object of the invention is the provision of a hair clipper designed to be inserted by the user into his own ear and manipulated without fear or risk of injury while clipping hair.

These and other more specific objects will appear upon reading the following specification and claims and upon considering in connection therewith the attached drawing to which they relate.

Referring now to the drawing in which a preferred embodiment of the invention is illustrated.

FIG. 1 is an elevational view of one preferred embodiment of the tool with the comb capped;

FIG. 2 is an enlarged cross-sectional view of the tool ready for use and with the protective cap detached;

FIG. 3 is a fragmentary enlarged sectional view taken along line 3—3 on FIG. 2;

FIG. 4 is a cross sectional view on an enlarged scale taken along line 4—4 on FIG. 2; and FIG. 5 is a fragmentary view of the comb as it appears in side elevation.

Referring initially more particularly to FIGS. 1 and 2, there is shown a preferred embodiment of the invention tool, designated generally 10, having a small diameter generally cylindrical casing 11. Supported at one end of the casing is a cylinder 12 housing a cutter head 13. Cylinder 12 is thin-walled and its outer end is slotted uniformly from its free end as indicated at 15, to provide a clipper comb. Details of the comb and of the cutter head will be described presently.

Housed within one end of casing 11 is a suitable miniature electric motor 18 held in assembled position, as by a screw 19. A suitable battery, such as the storage battery 20, is enclosed in the outer end of casing 11 with its center terminal 21 held in contact with one of the power contacts 22 of the motor by a removable casing enclosure 23. The latter includes a light helical spring 24 bearing against the metallic bottom of battery 20 and serving as a part of the power supply circuit for the motor by way of the metal casing 11 and screw 19. The power circuit to the motor is completed when spring leaf 25 is depressed into contact with member 26 of the motor by pushbutton 27. This pushbutton passes loosely through an insulating grommet 28 secured to the tool casing 11. Normally the circuit is open and the motor is de-energized.

Referring to FIGS. 2, 3 and 4, it will be understood that the cutter head 13 fits loosely within comb cylinder 12 and includes a non-circular shank 30 securely fixed or molded to a non-metallic combination coupling and bearing member 31. The latter is slotted crosswise of its lower end and fits loosely over the end of motor shaft 34 and straddles a pin 35 or the like extending transversely through the shaft. Bearing member 31 is preferably formed of nylon or the like plastic composition characterized by its excellent bearing and lubricity properties. The circumference of member 31 and the interior of cylinder 12 are accurately and smoothly finished to minimum close clearance tolerances and operate without need for lubrication.

The outer end portion of cutter head 13 is deeply notched along one quadrant as is indicated at 37 for an axial distance in excess of the length of comb slot 15 to provide a depository for cut hairs as well as ample space into which uncut hairs can project before being sheared. The cutter head is also provided with a deep radial opening 38 which is relatively narrow and long with oval upper and lower ends as shown in FIG. 2. Loosely and slidably seated in opening 38 is a cutter blade 39 biased outwardly by a light leaf spring 40 best shown in FIG. 3. The sharp longer leading edge 42 of this cutter blade bears directly against the interior sidewall of cylinder 12. As best appears from FIG. 4, the adjacent outer edge of the sidewall of opening 38 is relieved to enable hair extending through a slot of the comb to be sheared between the edge of the comb slot and cutting edge 42 of blade 39 as the head rotates counterclockwise. Desirably, cutter head 13 is provided with a vent 44 opening into the bottom of the blade seating opening 38 and through which lubrication for the cutting blade may be introduced.

When the tool is not in use, the comb is preferably enclosed by a friction fitting protective cap 45. The cutter head and its enclosing cylinder are detachably secured to the casing end by a retainer screw 48 having its inner end extending into the annular groove 49.

Normally the described tool is stored with protective cap 45 in place, the control pushbutton 27 being safeguarded against accidental closure by the surrounding grommet 28. When desiring to use the tool, it is merely necessary to remove cap 45. The total length of the tool being approximately 4 inches, it is readily placed in the palm of the user's hand and grasped by the fingers, with one fingertip opposite pushbutton 27. While held in this manner, the comb end of the tool is inserted into the nostril or the ear and the pushbutton is depressed to energize motor 18. Hair in the path of the comb readily enters through slots 15. Some of the hairs entering the slots may press momentarily against the periphery of the cutter head but, as opening 37 passes such comb slots, the hairs spring into the slot and are immediately caught against the edge of the slot by cutting edge 42 of blade 39. As is clearly evident from FIG. 4 individual hairs entering comb slots in advance of the counterclockwise rotation of the cutter head have ample opportunity to spring into opening 37 before being engaged by the cutter blade. It will be understood that the comb slots are shown several times actual size in FIGS. 3 and 5 and are, in reality, too small to admit anything except fine hair. The rounded tips of the comb elements ride easily over the flesh without risk of abrading or injuring it. As will be readily evident from the foregoing, the tool is freely manipulatable and the comb tip can be pressed into contact with the skin without risk of injury.

The trimmer head is quickly and easily cleaned by upending it or by blowing into hair reservoir 37, particularly while the cutter head is rotating. Spring 40 acting in concert with centrifugal forces serves to maintain the cutter edge in close running contact with the interior surface of the comb thereby assuring that even the finest of hairs are easily and positively severed without risk of the hair jamming between the cutter blade and the inner sidewall of the comb. It will therefore be recognized that it is unnecessary to provide a high-precision fit between adjacent sidewalls of cutter head 13 and the comb. In fact, a loose fit between these surfaces suffices because there is no need of close tolerances and, for this reason, there is no need for lubrication at these surfaces. In fact, no lubrication is required between the periphery of the cutter head components and the interior surface of cylinder 12 since there is little or no load on these parts and fully adequate lubrication is provided by the lubricity of the material of coupling member 31.

A single charge of battery 20 supplies the power needs over a period of many weeks after which the battery may be recharged by conventional charging equipment.

While the particular self-powered grooming tool herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. A self-powered grooming tool for clipping hair growth in the ear and nostril, said tool comprising a casing enclosing a miniature electric motor and a battery therefor, a cylinder fixed to said casing co-axially opposite one end of said electric motor and having an open outer end slotted to provide a comb sized for insertion into the nostril and the outer ear, cutter head means journalled within the outer end of said cylinder and having a driving connection with said electric motor, said cutter head having an opening through the side thereof and positioned opposite said comb slots, blade means movably mounted in said opening and having a sharp-edged outer end shaped to have a close-running fit with the interior sidewall of said comb and cooperating with the edges of the comb slots to cut hair entering said comb slots, and the side of the outer end portion of said cutter head means being cut away along the leading edge of said cutter blade to facilitate entry of hair into said comb slots,

2. A grooming tool as defined in claim 1 characterized in the provision of means lightly biasing said blade means into contact with the interior sidewall of said cylindrical comb.

3. A grooming tool as defined in claim 1 characterized in that said cutter head means includes thermoplastic coupling means drivingly connecting said cutter head means to said electric motor and including an outer end portion having a close running fit with the interior side wall of said cylinder.

4. A grooming tool as defined in claim 1 characterized in that said casing is sized to fit within the palm of the user's hand with said battery in axial alignment with said electric motor.

5. A grooming tool as defined in claim 4 characterized in the provision of normally open switch means mounted in the sidewall of said casing in a convenient position to be closed by the tip of a finger of the user's hand grasping said tool.

6. A grooming tool as defined in claim 4 characterized in that said battery is mounted at the end of said casing remote from said cutter head means.

7. A grooming tool as defined in claim 6 characterized in the provision of normally-closed but removable end cap at one end of said casing for use in servicing the battery for said electric motor.

8. A clipper assembly adapted for use in cutting hair growing in the outer ear and in the nostril, said assembly including a cylindrical housing member slotted axially of one end to provide a clipper comb sized for insertion into the nostril and the like openings, cutter head means journalled in said cylinder and having one sidewall thereof cut away opposite said comb to facilitate entry of hair into the slots of said comb, an elongated opening through the side of said cutter head means having one elongated edge thereof parallel to and closely spaced to the leading edge of the cut-away portion of said cutter head means, a cutter blade slidably supported in said elongated opening having a sharp cutting edge closely adjacent the elongated edge of said cutter head means and in close running contact with the interior side wall of said clipper comb, and means for coupling said cutter head to a rotary power source at the end thereof remote from said clipper comb.

References Cited

UNITED STATES PATENTS

| | | | |
|---|---|---|---|
| 1,860,409 | 5/1932 | Flink | 30—29.5 X |
| 3,054,179 | 9/1962 | Reiser | 30—29.5 |

ROBERT C. RIORDON, Primary Examiner

G. F. GRAFEL, Assistant Examiner